US007616976B2

(12) United States Patent
Fourquin et al.

(10) Patent No.: US 7,616,976 B2
(45) Date of Patent: Nov. 10, 2009

(54) CLAMSHELL-TYPE MOBILE PHONE WITH CAMERA

(75) Inventors: Xavier Fourquin, Sevres (FR); Jamal Housni, Courbevoie (FR)

(73) Assignee: IPG Electronics 504 Limited, St. Peter Port (GG)

( * ) Notice: Subject to any disclaimer, the term of this patent is extended or adjusted under 35 U.S.C. 154(b) by 519 days.

(21) Appl. No.: 11/633,642

(22) Filed: Dec. 5, 2006

(65) Prior Publication Data

US 2007/0149263 A1  Jun. 28, 2007

(30) Foreign Application Priority Data

Dec. 6, 2005  (EP)  .................................. 05111750

(51) Int. Cl.
*H04M 1/00* (2006.01)
(52) U.S. Cl. .................................. 455/575.3; 348/14.07
(58) Field of Classification Search ............. 455/575.3, 455/575.1, 550.1; 348/14.01, 14.02, 14.07
See application file for complete search history.

(56) References Cited

U.S. PATENT DOCUMENTS

2003/0040346 A1   2/2003   Fukuda et al.
2004/0116166 A1   6/2004   Makishima
2006/0063570 A1*  3/2006   Nishimura ............... 455/575.3
2006/0089183 A1*  4/2006   Chung et al. ............. 455/575.3

FOREIGN PATENT DOCUMENTS

EP       1404088 A1    3/2004

* cited by examiner

*Primary Examiner*—Tu X Nguyen
(74) *Attorney, Agent, or Firm*—Volpe and Koenig, PC

(57) ABSTRACT

A mobile phone having a clamshell type housing includes a first part, a second part linked rotating to the first part through a hinge so that the mobile phone can be in a closed position or in an open position, a first display which is accessible to a user when the mobile phone is in the open position, a second display which is accessible to a user on an external side of the first part when the mobile phone is in the closed position, and a camera on the first part, wherein the camera is located on an internal side of the first part so that it is directed to a user of the mobile phone when the mobile phone is in the open position for capturing images and/or videos which are displayed on the first display, and the second part includes an opening through which the camera can capture images and/or videos when the mobile phone is in the closed position that are displayed on the second display.

16 Claims, 1 Drawing Sheet

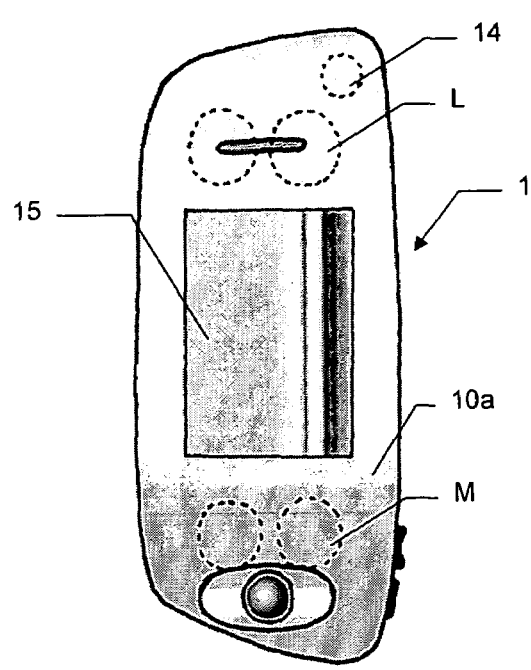
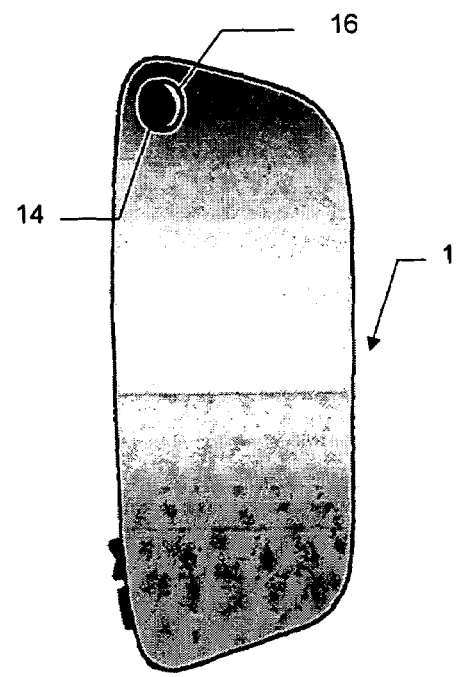
FIG. 1a  FIG. 1b
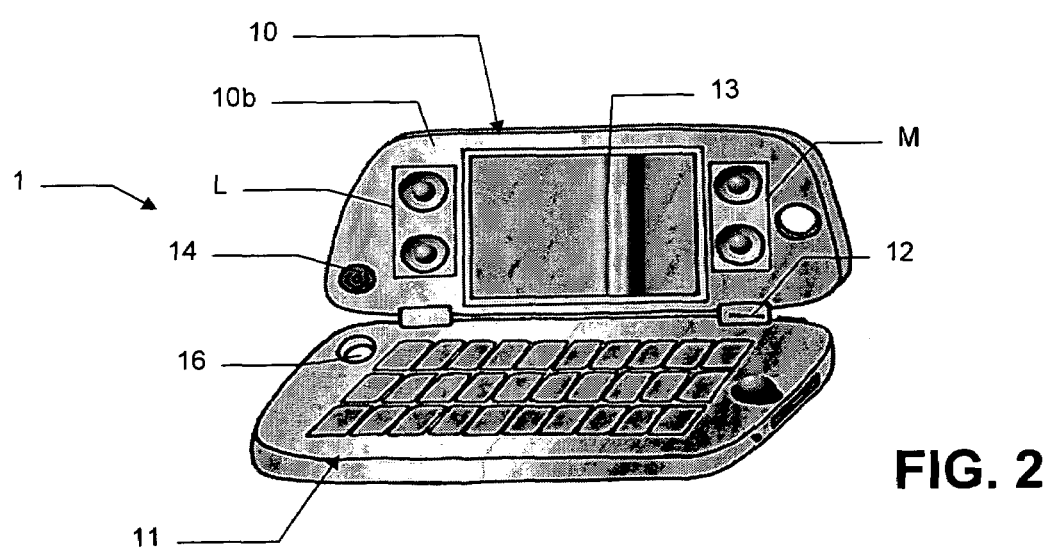
FIG. 2

CLAMSHELL-TYPE MOBILE PHONE WITH CAMERA

The present invention claims the benefit of European Patent Application No. 05111750.5 filed on Dec. 6, 2005, which is hereby incorporated by reference.

BACKGROUND OF THE INVENTION

Field of the Invention

Today, several mobile phones are of the clamshell type, i.e. present two parts linked to each other through a hinge, either parallel to the longitudinal axis of the phone (the phone can be thus open like a book, in landscape or portrait mode), or orthogonal to the longitudinal axis (flip phone).

Generally, the camera is located on the external side of the first part and is used when the mobile phone is in its open position. Indeed, the user of the mobile phone can the direct the camera towards the scene he wants to capture while seeing the scene on the first display. In these known solutions however, it is not very simple for the user to capture an image and/or a video of himself since, in this case, he has to direct the camera towards himself and thus, cannot view the scene on the first display.

One possible solution to this problem would be to modify the software of the mobile phone in order that a scene to be captured can be seen either simultaneously on both displays, whatever the current position (open or closed) of the mobile phone, or only on first display when the mobile phone is open and only on second display when the mobile is closed. This solution would be satisfactory in case the camera is always used in relation with an image and/or video capturing mode of the mobile phone, i.e. a mode in which image or video is captured and then stored for later playback.

However, this solution would be useless for cases in which the camera is used for a videoconference mode of the mobile phone, i.e. a communication mode wherein the user is in communication with other persons through at least the associated mobile communication network, and captured video of the user is to be sent in real time to these other persons. Indeed, in this case, the mobile phone must absolutely be held by the user in its open position because the acoustic means for communications (namely microphone and loudspeaker) are located inside the mobile phone. In this case, the user cannot use the camera located on the external side in the videoconference mode user.

Another known solution consists in providing the mobile phone with two cameras for capturing images and/or video on both positions of the mobile phone. This solution is however a costly solution.

Still another known solution consists in providing the mobile phone camera with a single camera mounted on mechanical means enabling the rotation of the camera depending on the scene the user wants to capture. However, the user has to manipulate the camera, and mechanical means are fragile.

SUMMARY OF THE INVENTION

Accordingly, the present invention is directed to a camera that substantially obviates one or more of the problems due to limitations and disadvantages of the related art.

An object of the invention is to provide a mobile phone of the clamshell's type wherein a single camera can be used whatever the open or closed position of the mobile phone, without the drawbacks of the know solutions.

To achieve these and other advantages and in accordance with the purpose of the present invention, as embodied and broadly described, a mobile phone having a clamshell type housing includes a first part, a second part linked rotating to the first part through a hinge so that the mobile phone can be in a closed position or in an open position, a first display which is accessible to a user when the mobile phone is in the open position, a second display which is accessible to a user on an external side of the first part when the mobile phone is in the closed position, and a camera on the first part, wherein the camera is located on an internal side of the first part so that it is directed to a user of the mobile phone when the mobile phone is in the open position for capturing images and/or videos which are displayed on the first display, and the second part includes an opening through which the camera can capture images and/or videos when the mobile phone is in the closed position that are displayed on the second display.

In another aspect, a mobile phone includes a first part and a second part linked by a hinge to exist in one of a closed position and an open position, a first display accessible to a user when the mobile phone is in the open position, a second display accessible to a user on an external side of the first part when the mobile phone is in the closed position, and a camera on the first part, wherein the camera is located on an internal side of the first part so that it is directed to a user of the mobile phone when the mobile phone is in the open position for capturing images displayed on the first display, and the second part includes an opening through which the camera can capture images when the mobile phone is in the closed position that are displayed on the second display.

In another aspect, a mobile phone includes a first part and a second part linked by a hinge to exist in one of a closed position and an open position, a first display accessible to a user when the mobile phone is in the open position, a second display accessible to a user on an external side of the first part when the mobile phone is in the closed position, and a camera on the first part, wherein the camera is located on an internal side of the first part so that it is directed to a user of the mobile phone when the mobile phone is in the open position for capturing video images displayed on the first display, and the second part includes an opening through which the camera can capture video images when the mobile phone is in the closed position that are displayed on the second display.

In another aspect, the camera is used for an image and/or video capturing mode of the mobile phone whatever the open or closed position of the mobile phone. In this case, the user of the mobile phone, thanks to a unique camera, can easily capture images or video of any scene, including himself.

In another aspect, alternatively, or in combination, the camera can also be used for an image and/or video capturing mode of the mobile phone when said mobile phone is in said closed position, while said camera is used for a videoconference mode of the mobile phone when said mobile phone is in said open position.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 1a and 1b respectively show front and rear views, including an exemplary phone in a closed position according to the present invention; and FIG. 2 shows the exemplary phone of FIGS. 1a and 1b in an open position according to the present invention.

DETAILED DESCRIPTION OF THE PREFERRED EMBODIMENTS

Reference will now be made in detail to the preferred embodiments of the present invention, examples of which are illustrated in the accompanying drawings.

FIGS. 1a, 1b, and 2 show a phone 1 with a housing of the clamshell's type. More precisely, said housing comprises a first or front part 10 and a second or back part 11 linked rotating together through a hinge 12. Phone 1 can be either in a closed position (FIGS. 1a and 1b) or in an open position (FIG. 2).

Phone 1 also comprises a first display 13 accessible to a user when phone 1 is in said open position. and a second display 15 which is accessible to a user on an external side 10 of said first or front part 10 when phone 1 is in said closed position (see FIG. 1a) and a camera 14 for capturing image and/or video. At last, microphone M and loudspeaker L are accessible to the user when the mobile is in its open position for communication via an associated mobile network.

According to the invention, said camera 14 is located on an internal side 10b of said first part 10 so that it can be directed to a user of the mobile phone when mobile phone is in said open position for capturing images and/or videos (see FIG. 2). Captured images and/or video can be displayed on first display 13. For use of the same camera while the mobile phone is in its closed position, second part 11 comprises an opening 16 which faces said camera when mobile phone is closed, as shown on FIG. 1b. Camera 14 can thus be also used in order to capture images and/or videos when mobile phone is in said closed position, said captured images and/or video being then displayed on said second display 15.

Thus, according to the invention, it is possible to use the same camera located inside the phone in order to capture images and/or videos whatever the position (closed or open) of the phone.

More precisely, when the phone is closed, camera will be used in an image and/or video capturing mode. When the phone is open, camera can be used either in an image and/or video capturing mode. Consequently, the user can also take a picture or a video of himself, or in a videoconference mode.

Advantageously, a lens can be fixed in opening 16 in order to enable a zoom on the images to be captured only when the phone is in closed position.

It will be apparent to those skilled in the art that various modifications and variations can be made in the camera of the present invention without departing from the spirit or scope of the invention. Thus, it is intended that the present invention cover the modifications and variations of this invention provided they come within the scope of the appended claims and their equivalents.

What is claimed is:

1. A mobile phone having a clamshell type housing, the mobile phone comprising:
   a first part;
   a second part linked rotating to the first part through a hinge so that the mobile phone can be in a closed position or in an open position;
   a first display which is accessible to a user when the mobile phone is in the open position;
   a second display which is accessible to a user on an external side of the first part when the mobile phone is in the closed position; and
   a camera on the first part,
   wherein the camera is located on an internal side of the first part so that it is directed to a user of the mobile phone when the mobile phone is in the open position for capturing images and/or videos which are displayed on the first display, and the second part includes an opening through which the camera can capture images and/or videos when the mobile phone is in the closed position that are displayed on the second display.

2. The mobile phone according to claim 1, wherein the camera is used for an image and/or video capturing mode of the mobile phone in any of the open or closed positions of the mobile phone.

3. The mobile phone according to claim 2, further comprising a lens is fixed in the opening in order to enable a zoom on the images to be captured.

4. The mobile phone according to claim 2, wherein the camera is used for an image and/or video capturing mode of the mobile phone when the mobile phone is in the closed position, and the camera is used for a videoconference mode of the mobile phone when the mobile phone is in the open position.

5. The mobile phone according to claim 4, further comprising a lens is fixed in the opening in order to enable a zoom on the images to be captured.

6. The mobile phone according to claim 1, wherein the camera is used for an image and/or video capturing mode of the mobile phone when the mobile phone is in the closed position, and the camera is used for a videoconference mode of the mobile phone when the mobile phone is in the open position.

7. The mobile phone according to claim 6, further comprising a lens is fixed in the opening in order to enable a zoom on the images to be captured.

8. The mobile phone according to claim 1, further comprising a lens is fixed in the opening in order to enable a zoom on the images to be captured.

9. A mobile phone, comprising:
   a first part and a second part linked by a hinge to exist in one of a closed position and an open position;
   a first display accessible to a user when the mobile phone is in the open position;
   a second display accessible to a user on an external side of the first part when the mobile phone is in the closed position; and
   a camera on the first part,
   wherein the camera is located on an internal side of the first part so that it is directed to a user of the mobile phone when the mobile phone is in the open position for capturing images displayed on the first display, and the second part includes an opening through which the camera can capture images when the mobile phone is in the closed position that are displayed on the second display.

10. The mobile phone according to claim 9, wherein the camera is used for capturing of the images in any of the open or closed positions.

11. The mobile phone according to claim 10, further comprising a lens affixed in the opening to enable a zoom mode during the capturing of the images.

12. The mobile phone according to claim 9, wherein the camera is used for an image capturing mode of the mobile phone when the mobile phone is in the closed position, and the camera is used for a videoconference mode of the mobile phone when the mobile phone is in the open position.

13. A mobile phone, comprising:

a first part and a second part linked by a hinge to exist in one of a closed position and an open position;

a first display accessible to a user when the mobile phone is in the open position;

a second display accessible to a user on an external side of the first part when the mobile phone is in the closed position; and a camera on the first part, wherein the camera is located on an internal side of the first part so that it is directed to a user of the mobile phone when the mobile phone is in the open position for capturing video images displayed on the first display, and the second part includes an opening through which the camera can capture video images when the mobile phone is in the closed position that are displayed on the second display.

14. The mobile phone according to claim 13, wherein the camera is used for capturing of the video images in any of the open or closed positions.

15. The mobile phone according to claim 13, further comprising a lens affixed in the opening to enable a zoom mode during the capturing of the video images.

16. The mobile phone according to claim 13, wherein the camera is used for a video capturing mode of the mobile phone when the mobile phone is in the closed position, and the camera is used for a videoconference mode of the mobile phone when the mobile phone is in the open position.

* * * * *